(12) United States Patent
Jani et al.

(10) Patent No.: US 7,332,186 B2
(45) Date of Patent: Feb. 19, 2008

(54) METHOD OF MAKING CENTERFILLED GUM PRODUCT WITH CANDY SHELL

(75) Inventors: Bharat Jani, East Brunswick, NJ (US); Marc Degady, Morris Plains, NJ (US); Richard Mark Warrington, Sparta, NJ (US); Demian Arenas, Minneapolis, MN (US); Edward M. Janos, Basking Ridge, NJ (US)

(73) Assignee: Cadbury Adams USA LLC, Parsippany, NJ (US)

( * ) Notice: Subject to any disclaimer, the term of this patent is extended or adjusted under 35 U.S.C. 154(b) by 3 days.

(21) Appl. No.: 10/664,427

(22) Filed: Aug. 26, 2003

(65) Prior Publication Data
US 2004/0037925 A1   Feb. 26, 2004

Related U.S. Application Data

(62) Division of application No. 09/803,857, filed on Mar. 12, 2001, now Pat. No. 6,623,266.

(60) Provisional application No. 60/262,913, filed on Jan. 19, 2001.

(51) Int. Cl.
*A23B 7/16* (2006.01)
*A23G 4/20* (2006.01)
*A23P 1/08* (2006.01)
*A23P 1/12* (2006.01)

(52) U.S. Cl. ........................ 426/3; 426/307; 426/421; 426/516

(58) Field of Classification Search ............... 426/3–6, 426/90, 91, 134, 421, 302, 305, 512, 516, 426/307
See application file for complete search history.

(56) References Cited

U.S. PATENT DOCUMENTS

| 325,711 | A | | 9/1885 | Stuckes, Jr. | |
|---|---|---|---|---|---|
| 810,210 | A | * | 1/1906 | Laws | 426/5 |
| 943,945 | A | | 12/1909 | Liebich | |
| 2,004,957 | A | | 6/1935 | Messner | |
| 2,448,786 | A | | 9/1948 | Faxon | |
| 2,973,273 | A | | 2/1961 | Curtiss | |
| 3,062,662 | A | * | 11/1962 | McDonald | 426/5 |
| 3,071,476 | A | | 1/1963 | Werft et al. | |
| 3,795,748 | A | | 3/1974 | Cillario | |

(Continued)

FOREIGN PATENT DOCUMENTS

EP     0086856     8/1983

(Continued)

OTHER PUBLICATIONS

"LMC Internation" http://www.lmcinternational.com/inprint-html/98-9-pr.html Sep. 1998.*

(Continued)

*Primary Examiner*—Arthur L. Corbin
(74) *Attorney, Agent, or Firm*—Hoffmann & Baron, LLP (57) ABSTRACT

A three-phase center-filled gum or bubble gum candy lollipop product. An extruded gum or bubble gum material has a semi-liquid center-fill material added to it in a batch forming mechanism simultaneously with the formation of an exterior candy shell. The three-phase rope of material is formed into lollipop candy members in a forming machine and lollipop sticks are inserted into them. The formed lollipop products are then cooled, tumbled and prepared for further processing.

4 Claims, 9 Drawing Sheets

U.S. PATENT DOCUMENTS

| | | | |
|---|---|---|---|
| 3,806,290 A | 4/1974 | Graff et al. | |
| 3,857,963 A | 12/1974 | Graff et al. | |
| 3,894,154 A | 7/1975 | Graff et al. | |
| 4,150,161 A | 4/1979 | Rudolph et al. | |
| 4,156,740 A | 5/1979 | Glass et al. | |
| 4,157,402 A | 6/1979 | Ogawa et al. | |
| 4,250,196 A | 2/1981 | Friello | |
| 4,252,829 A | 2/1981 | Terrevazzi | |
| 4,271,197 A | 6/1981 | Hopkins et al. | |
| 4,292,329 A | 9/1981 | Ogawa et al. | |
| 4,301,178 A | 11/1981 | Witzel et al. | |
| 4,316,915 A | 2/1982 | Friello et al. | |
| 4,352,823 A | 10/1982 | Cherukuri et al. | |
| 4,352,825 A | 10/1982 | Cherukuri et al. | |
| 4,374,858 A | 2/1983 | Glass et al. | |
| 4,399,154 A | 8/1983 | Puglia et al. | |
| 4,421,773 A | 12/1983 | Akutagawa | |
| 4,430,351 A | 2/1984 | Cillario | |
| 4,466,983 A | 8/1984 | Cifrese et al. | |
| 4,513,012 A | 4/1985 | Carroll et al. | |
| 4,563,345 A | 1/1986 | Arrick | |
| 4,601,907 A | 7/1986 | Knebl et al. | |
| 4,614,658 A | 9/1986 | Wilson et al. | |
| 4,642,235 A | 2/1987 | Reed et al. | |
| 4,647,450 A | 3/1987 | Peters et al. | |
| 4,683,138 A | 7/1987 | Glass et al. | |
| 4,707,363 A | 11/1987 | Sato et al. | |
| 4,762,719 A | 8/1988 | Forester | |
| 4,938,128 A | 7/1990 | Knebl | |
| 4,949,630 A | 8/1990 | Knebl | |
| 4,975,288 A * | 12/1990 | Hager et al. | 426/5 |
| 4,980,178 A | 12/1990 | Cherukuri et al. | |
| 4,997,659 A | 3/1991 | Yatka et al. | |
| 5,125,819 A | 6/1992 | Hager et al. | |
| 5,156,866 A | 10/1992 | Sato et al. | |
| 5,244,887 A | 9/1993 | Straub | |
| 5,279,842 A | 1/1994 | Escola Gallart et al. | |
| 5,399,365 A | 3/1995 | Yatka et al. | |
| 5,425,961 A | 6/1995 | Yatka et al. | |
| 5,431,929 A | 7/1995 | Yatka et al. | |
| 5,458,892 A | 10/1995 | Yatka et al. | |
| 5,498,429 A | 3/1996 | Orlandi et al. | |
| 5,502,045 A | 3/1996 | Miettinen et al. | |
| 5,525,360 A | 6/1996 | Yatka et al. | |
| 5,612,070 A | 3/1997 | Yatka et al. | |
| 5,626,896 A | 5/1997 | Moore et al. | |
| 5,667,824 A * | 9/1997 | Ream et al. | 426/5 |
| 5,670,163 A | 9/1997 | Cuca et al. | |
| 5,879,728 A | 3/1999 | Graff et al. | |
| 5,952,019 A | 9/1999 | Yatka et al. | |
| 6,054,144 A | 4/2000 | Burruano et al. | |
| 6,087,353 A | 7/2000 | Stewart et al. | |
| 6,242,019 B1 | 6/2001 | Bell et al. | |
| 6,280,762 B1 | 8/2001 | Bealin-Kelly et al. | |
| 6,280,780 B1 | 8/2001 | Degady et al. | |
| 6,284,291 B1 | 9/2001 | Siecke et al. | |
| 6,306,429 B1 | 10/2001 | Bealin-Kelly | |
| 6,432,441 B1 | 8/2002 | Bealin-Kelly et al. | |
| 6,472,001 B1 | 10/2002 | Bunkers et al. | |
| 6,491,540 B1 | 12/2002 | Barreca | |
| 6,528,102 B1 | 3/2003 | Coyle et al. | |
| 6,558,727 B2 | 5/2003 | Degady et al. | |
| 6,562,382 B1 | 5/2003 | Corriveau et al. | |
| 6,602,518 B2 | 8/2003 | Seielstad et al. | |
| 6,613,346 B2 | 9/2003 | Seielstad et al. | |
| 6,623,266 B2 | 9/2003 | Jani et al. | |
| 6,652,839 B2 | 11/2003 | Barreca | |
| 6,759,079 B2 | 7/2004 | Klug et al. | |
| 6,838,098 B2 | 1/2005 | Bunkers et al. | |
| 6,869,614 B2 | 3/2005 | Barreca | |
| 6,949,264 B1 | 9/2005 | McGrew et al. | |
| 2002/0004083 A1 | 1/2002 | Yatka et al. | |
| 2002/0136812 A1 | 9/2002 | Degady et al. | |
| 2002/0142059 A1 | 10/2002 | Jani et al. | |
| 2003/0059501 A1 | 3/2003 | Rivier | |
| 2003/0138518 A1 | 7/2003 | Kiefer et al. | |
| 2004/0037788 A1 | 2/2004 | Barreca | |
| 2004/0037924 A1 | 2/2004 | Jani et al. | |
| 2004/0037925 A1 | 2/2004 | Jani et al. | |
| 2004/0126472 A1 | 7/2004 | Soldani | |
| 2004/0131751 A1 | 7/2004 | Dekker et al. | |
| 2004/0234459 A1 | 11/2004 | Faust et al. | |
| 2005/0260317 A1 | 11/2005 | Cotten et al. | |
| 2005/0260329 A1 | 11/2005 | Yusuf et al. | |
| 2006/0024354 A1 | 2/2006 | Barreca | |

FOREIGN PATENT DOCUMENTS

| | | |
|---|---|---|
| EP | 0806151 | 11/1997 |
| EP | 0944331 | 9/1999 |
| EP | 1003475 | 5/2000 |
| EP | 1004594 | 5/2000 |
| EP | 1151673 | 11/2001 |
| EP | 1425976 | 6/2004 |
| EP | 1699297 A1 | 6/2005 |
| WO | WO 95/08925 | 4/1995 |
| WO | WO 00/06127 | 2/2000 |
| WO | WO 00/19977 | 4/2000 |
| WO | WO 01/67884 | 9/2001 |

OTHER PUBLICATIONS

"Centres for High Boilings—Fruit Pulp, Caramel, Treacle or Powder", by Sweetmaker, Confectionery Production, vol. 48, Aug. 1982, pp. 344-345.

Long, T., "Producing Centre Filled Hard Candy, Chewing Gum and Toffees", Candy and Snack Industry, vol. 145, Nov. 1980, No. 11, pp. 34, 37.

Gonze, M., "High Purity Erythritol for New Health Food Applications", ZFL, Internationale Zeitschrift Fur Lebensmittel-Tichnik, Marketing, Verpackung and Analytik, vol. 47, 1996, No. 11, pp. 66-68.

McIntyre, M., "Isomalt as an International Sugar Replacer", Food Ingredients and Analysis International, vol. 23, 2001, No. 6, pp. 35-36.

Deis, R., "Polyols in Confectionery", Manufacturing Confectioner, vol. 80, Oct. 2000, No. 10, pp. 53-57.

Hyvoenen, L., et al., "Food Technological Evaluation of Xylitol", Advances in Food Research, vol. 28, 1982, pp. 373-403.

Fritz, Douglas P., "Using Confectionery Equipment to Manufacture Chewing Gum", Manufacturing Confectioner, Nov. 2000, vol. 80, No. 11, pp. 45-48.

Rogers, P., "Helping the Medicine Go Down", vol. 166, 2001, No. 5, pp. 36-40.

"Product Parade", Candy Industry, Dec. 1991, p. 10.

Honpo, Senjakuame, "Orange Pure Sherbet Candy; Lemon Pure Sherbet Candy Manufacturer", International Product Alert, Nov. 1991, vol. 8, No. 21.

Shokuhin, Kanebo, "Ninja Club", International Product Alert, Dec. 1986, Report No. 044453.

"Mega Warheads Fruit Flavored Candy—Sour Lemon; Fruit Flavored Candy—Sour Apple; Fruit Flavored Candy—Hot Grape; Fruit Flavored Candy—Hot Cherry", by Foreign Candy Co., Inc., Product Alert, Jun. 1992, vol. 22, No. 23, Report No. 096490.

Matlow, Swizzels, "Stingers Taffy Bar—Lemon Raspberry; Fruit Punch", Nov. 1994, Report 120966.

"Calpis Candy—Assortment by Kanro", Japanscan, May 2000, Report 193961.

Kanro 10 Tsubu Hinyari Suika Nodoame 10 Candy by Kanro; Jul. 2002, Report 242381.

Lieberman, Herbert A., Lachman, Leon, "Pharmaceutical Dosage Forms", Tablets, vol. 1, pp. 386-399, no date noted.

Jackson, E.B., "Cerelose—The Confectionery Industry's Natural Sweetener", Confectionery Manufacture and Marketing, vol. 28, Jun. 1991, No. 6, pp. 20, 22.

Jackson, E.B., "Cerelose—It's Role in Improved Confectionery", Confectionery Production, vol. 57, Jan. 1991, No. 1, pp. 79, 91.

Hintlian, F., "Filled Hard Candy"; Manufacturing Confectioner, vol. 75, Oct. 1995, No. 10, pp. 61-66.

Hume, J., "Notebook of a Practical Confectioner, Part 5—Continuation of Recipes for Centres", Confectionery Production, vol. 44, Jan. 1978, pp. 18, 20.

* cited by examiner

METHOD OF MAKING CENTERFILLED GUM PRODUCT WITH CANDY SHELL

CROSS-REFERENCE TO RELATED APPLICATIONS

This is a division of U.S. patent application Ser. No. 09/803,857 filed on Mar. 12, 2001 now U.S. Pat. No. 6,623,266, which claims the benefit of U.S. Provisional Application No. 60/262,913, filed Jan. 19, 2001.

TECHNICAL FIELD

The present invention relates to center-filled lollipops and more particularly to hard candy lollipops having a liquid-filled gum center insert.

BACKGROUND OF THE INVENTION

Hard shelled candy lollipops with a center material or insert of a different material are known. Two-phase products of this type include "Tootsie Pops" which have a hard candy outer layer and a softer candy filling in the center. Another known two-phase product is the "Blow Pop," which has a hard candy shell and a bubble-gum filling in the center.

There also are a number of two-phase gum products on the marketplace, such as "Bubbaloo" and "Freshen-Up". These individual gum pieces have an outer shell with a soft or syrup-like center filling or core.

To date, it has not been possible to produce an acceptable three-phase candy lollipop product, or a lollipop product with a semi-liquid core, due to difficulties in constraining the semi-liquid core from leaking during manufacture of the product and/or during insertion of the lollipop stick. There are no lollipop products on the market today which have a three-phase constituency, that is which have three distinct layers or areas of different materials, one of which is a semi-liquid-type material.

SUMMARY OF THE INVENTION

It is an object of the present invention to provide an improved candy lollipop-making process. It is also an object of the present invention to provide a system and process for making semi-liquid center-filled lollipop products.

It is a further object of the present invention to provide a system and method for producing a lollipop product with three distinct materials or phases. It is a still further object of the present invention to provide a system and process for making a three-phase lollipop product in which one of the phases is a semi-liquid-type material.

In accordance with the present invention, an improved system and process are provided for making a center-filled lollipop product, the lollipop being center-filled with a gum or bubble gum material and a semi-liquid type material. The gum or bubble gum product is extruded as a "rope" from an extruder and passed through a tube into a batch former apparatus or mechanism. A semi-liquid material is injected into the gum material as it is passed through or ejected from the tube forming a center-filled rope. Molten candy material is transferred from a candy laminator and added to the batch former surrounding the tube member. Rotating conical rollers mold the candy around the tube member and form a candy exterior shell around the extruded center-filled gum.

The three-phase product is then fed through a rope sizer and into a lollipop forming machine. The three-phase extruded product is formed into individual pieces of candy and lollipop sticks are inserted into them as they are rotating and sliding around on the forming head in the lollipop forming machine. The final lollipop products are ejected from the forming machine and transferred by a conveyer system to a cooling tunnel or mechanism. The formed products are shaken and cooled in the cooling tunnel and, once the process is completed, sent to storage for further processing or to a separate department for immediate packaging and shipping.

The present invention provides a flavor release across all three layers or phases which improves the sensory effect to the consumer. The hard candy exterior provides a first satisfying flavor as it dissolves. The gum center provides a chewing attribute-together with an additional flavor release. The semi-liquid center fill provides a sudden and high impact of acid and quick dissolution with a sense of surprise and satisfaction. Finally, the bubble gum allows the consumer to continue to blow bubbles even after some of the flavors are released and consumed.

Further benefits, features and details of the invention will become apparent from a review of the following description, when taken in view of the accompanying drawings and appended claims.

DESCRIPTION OF THE PREFERRED EMBODIMENTS

Figure 1:
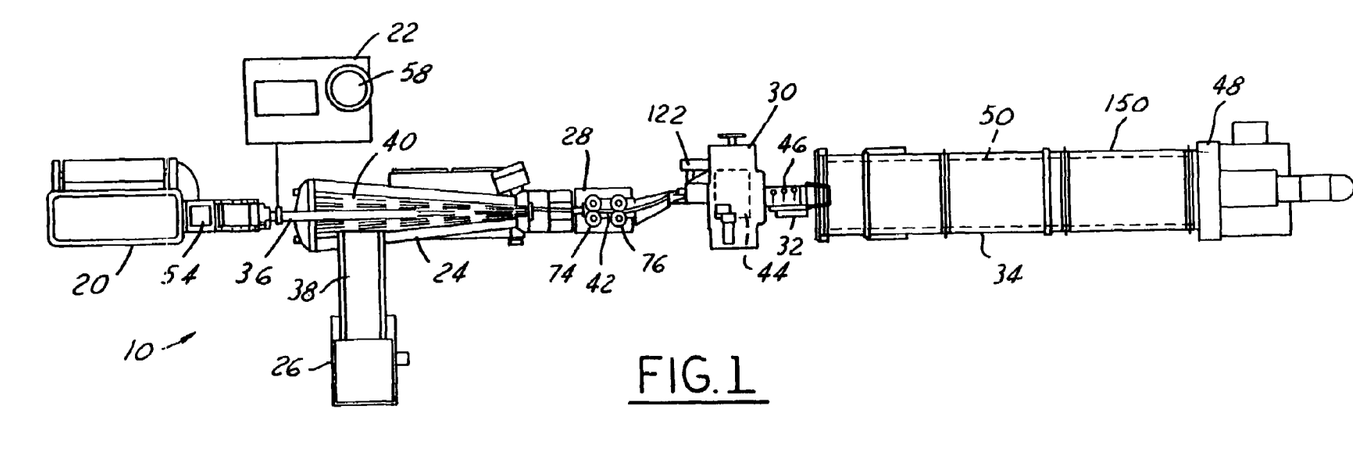
FIG. 1 is a schematic top view of a center-filled lollipop-forming process and system in accordance with the present invention.
Figure 2:
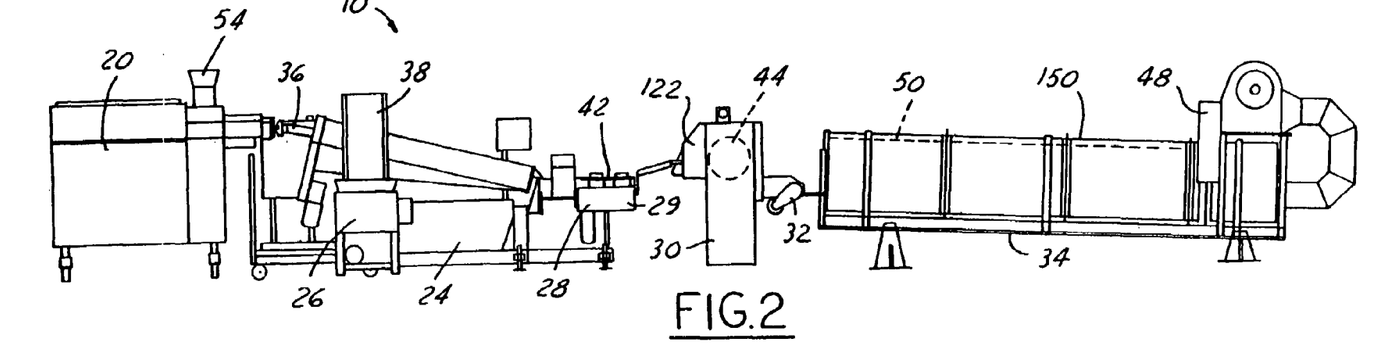
FIG. 2 is a side view of the system and process illustrated in FIG. 1.

A system for making center-filled candy lollipops in accordance with the present invention is shown in FIGS. 1 and 2 and referred to by the reference numeral 10. FIG. 1 is a top elevational view of the system and FIG. 2 is a side elevational view of the system shown in FIG. 1.

In general, the system 10 includes an extruder 20, a supply system 22 for the center-filled semi-liquid portion, a batch forming mechanism 24, a candy laminator mechanism 26, a rope sizing mechanism 28, a lollipop forming machine 30, a conveyor apparatus 32, and a cooling device or mechanism 34.

The gum or bubble gum material is placed in extruder 20 where it is extruded as a "rope," that is an extrusion having a generally circular cross-section. The rope of gum material is filled with a semi-liquid-type material from center-filled system 22. The gum material is extruded through tube member 36 into the center of the batch forming mechanism 24. Candy from candy laminator 26 is passed along conveyor belt 38 and transferred into the batch forming mechanism 24. A plurality of conical rollers 40 ("roller cluster") in the batch forming apparatus form the candy into a cone-shaped plastic mass around the tubular member 36 and in turn around the extruded gum material as it exits the tubular member 36.

Thereafter, the "rope" of composite three-phase material 42 travels along the sizing mechanism 28 where sets of sizing rollers form it into the final size and shape for entry into the lollipop forming machine 30. A rotating drum mechanism 44 (described in more detail below) forms the three-phase candy/gum/semi-liquid-fill rope of material into individual pieces of candy and inserts lollipop sticks into each of the pieces. The lollipop products 46 are then ejected from the forming machine 30 onto the conveyor mechanism 32 which conveys them to the cooling tunnel 34. The cooling tunnel has a rotating barrel 50 in which air is circulated in order to cool and harden the final lollipop products. A motor 48 is used to rotate the barrel 50 of the cooling tunnel 34.

Figure 6:
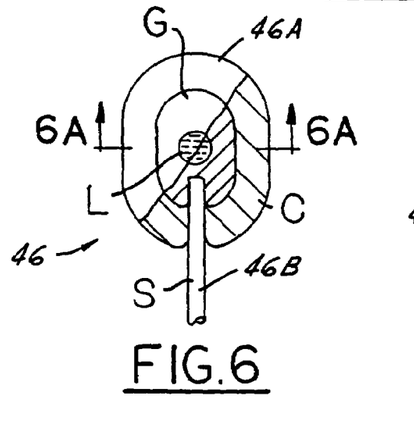
FIG. 6 schematically illustrates a final center-filled lollipop product made in accordance with the present invention, the product being shown in partial cross-section.
Figure 6A:
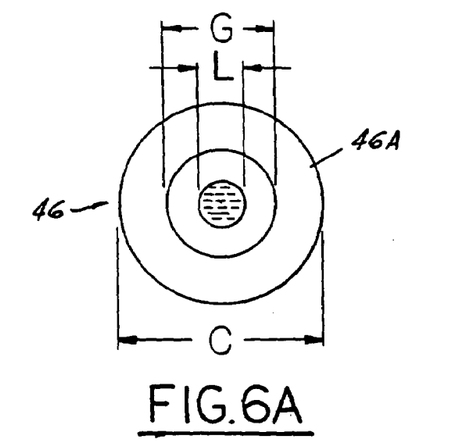
FIG. 6A is a cross-section of the lollipop product as shown in FIG. 6, the cross-section being taken along line 6A-6A in FIG. 6.

Products made in accordance with the present invention are shown schematically in FIGS. 6 and 6A. The candy lollipop products 46 are three-phase products, that is they constitute three distinct layers of three different materials. As shown in FIGS. 6 and 6A, the lollipop products 46 include a semi-liquid center L (typically of jelly-like consistency), a second layer of soft gum or bubble gum material G and a hard outer layer of candy material C. A lollipop stick S, which is inserted into the three-phase product during the forming process forms the completed lollipop product.

Figure 3:
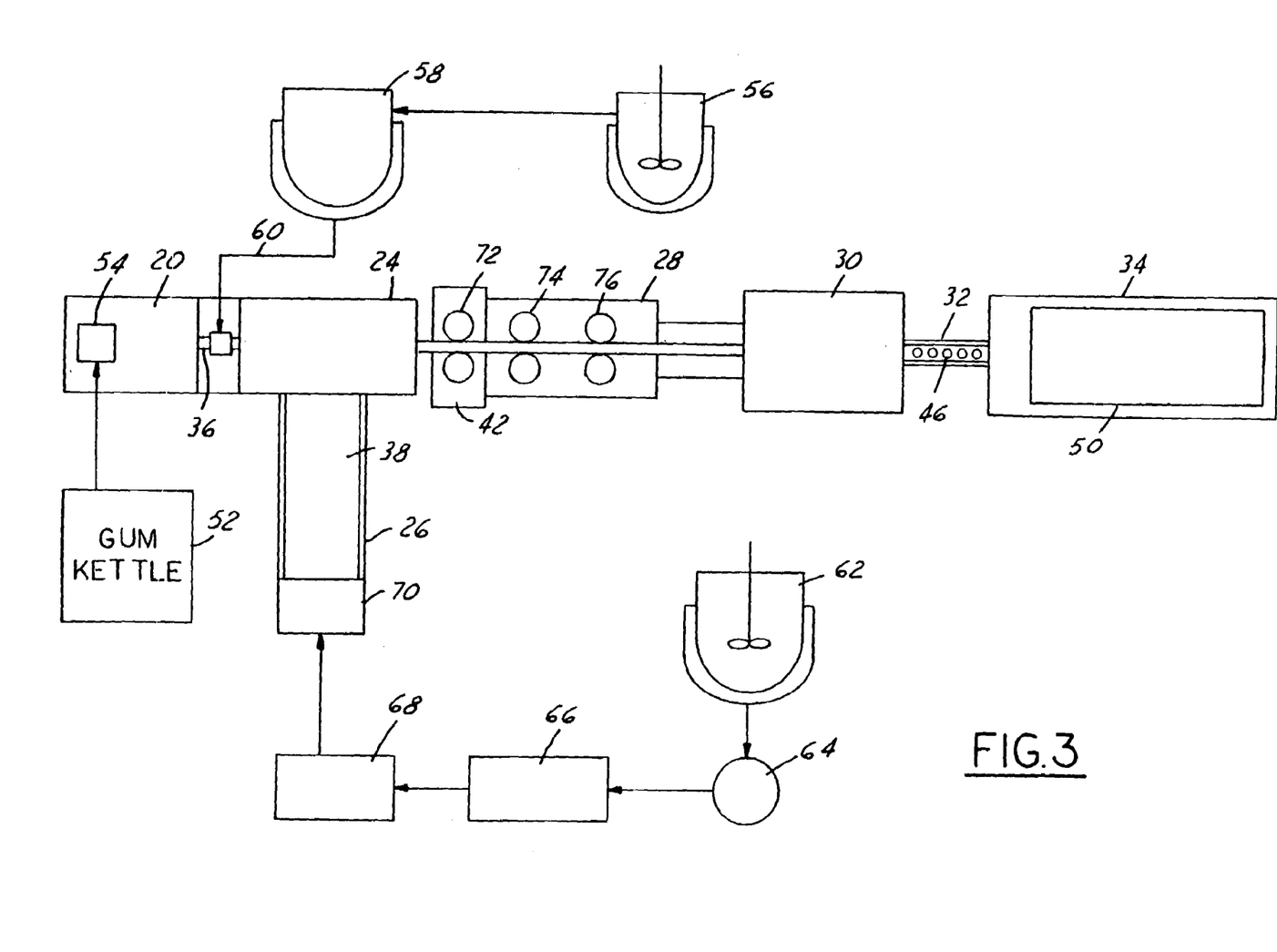
FIG. 3 is a schematic diagram of a system and process for making center-filled lollipop products in accordance with one embodiment of the present invention.

A schematic diagram of one embodiment of the inventive system and process in accordance with the present invention is shown in FIG. 3. The gum material which is to be extruded from the extruder 20 is first formed by any conventional process, such as in batches in kettle 52. Gum products made by a batch process are typically made in a sigma blade kettle mechanism. Gum processes of this type are disclosed, for example, in U.S. Pat. Nos. 4,329,369 and 4,968,511. It is also possible to provide gum or bubble gum material which is made by an extrusion process in a continuous mixer. Processes of this type are shown, for example, in U.S. Pat. Nos. 5,045,325 and 5,135,760.

The gum material for the candy lollipop is transferred from the kettle 52 into inlet or opening 54 in the extruder mechanism 20. In the extruder 20, the gum material is further mixed and conveyed by a rotating screw mechanism toward an extrusion die 116 (FIG. 7) at the downstream end.

In the system in accordance with the present invention, the gum or bubble gum material is extruded as a "rope" of generally circular cross-section into a tube or tubular member 36 where it, in turn, is extruded into the batch forming mechanism 24.

The extruder 20 can be of any conventional type, such as a Togum extruder.

The material for the semi-liquid center-fill phase of the lollipop product is made in a kettle 56 and then transferred to a storage tank 58. The liquid center-fill material typically has a syrup-like or jelly-like consistency. The center-fill material is cooled and has flavoring and coloration added as desired. The center-fill material is then transferred through conduit 60 where it is eventually injected into the center of the extruded rope of gum material.

The candy material used for forming the outer layer or shell of the lollipop products is initially cooked in a batch cooker 62. From there, the material is transferred to a collecting pot 64 where coloration can be added, and then is distributed on a cooling table 66 where acid and flavoring ingredients are typically folded into it. Thereafter, the cooled candy material, which is viscous and has a consistency similar to a thick molasses, is then sent to a kneading machine 68 where it is subjected to a mixing and kneading process. At that point, the candy is then transferred to hopper 70 in the candy laminator apparatus or mechanism 26. Conveyor transfer belt 38 conveys the molten candy material from the hopper 70 into the batch forming mechanism 24.

Figure 4:
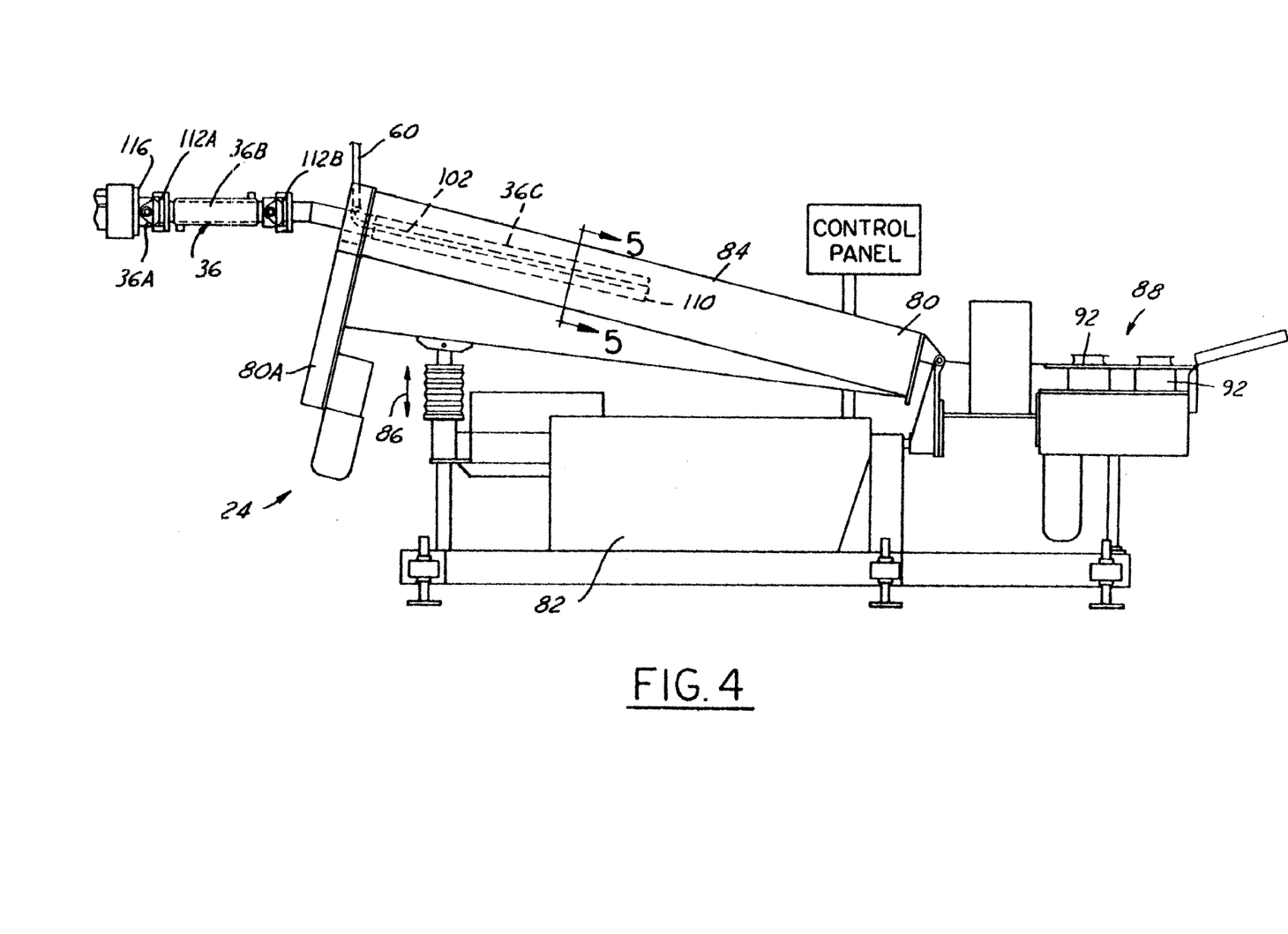
FIG. 4 illustrates a batch forming mechanism for use with the present invention.
Figure 5:
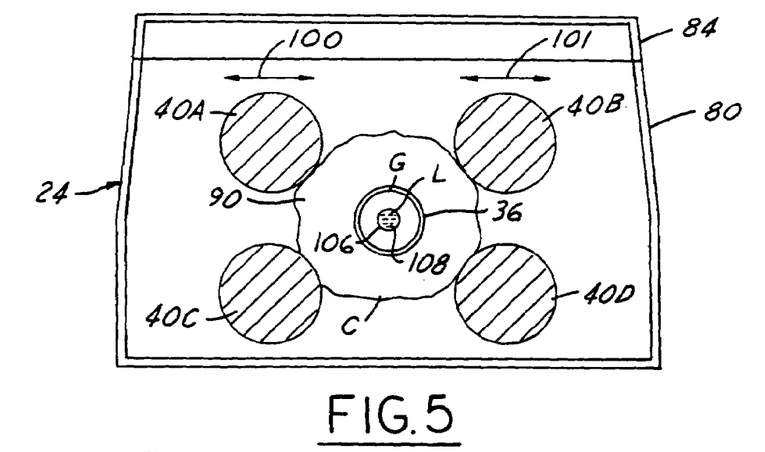
FIG. 5 is a cross-section of the batch forming mechanism shown in FIG. 4, the cross section being taken along line 5-5 in FIG. 4.

A batch forming mechanism which can be used with the present invention is shown in FIGS. 4 and 5. Batch forming machines of this the are made, for example, by the Latini Machine Company in Elmhurst, Ill. (such as Model 78). The batch forming mechanism 24 has a candy forming portion or section 80 and a base 82. The forming section 80 has a plurality of conical stainless-steel rollers 40A, 40B, 40C, and 40D forming a "roller cluster". The rollers all rotate in the same direction for a period of time and in the opposite direction for a period of time (from 1 to 60 seconds). This prevents twisting of the candy material in the mass and prevents the mass from becoming wound around one or more of the rollers. The change of direction of the rollers is accomplished by a timing switch, which is adjustable. The rollers 40A-40D suspend the mass of molten candy material 90 which is transferred into it from the candy laminator 26 and form it into a conical mass around the centrally-located tube member 36. The conical mass is shaped into a continuous length of rope of a specific diameter.

A hinge cover member 84 can be positioned over forming section 80. The hinged cover 84 has a plurality of heaters or heating elements (not shown), which can be used to maintain the candy and gum material at an appropriate temperature in the forming section 80.

The base section 82 contains motors (not shown) for rotating the conical rollers 40A-40D, as well as a hydraulic system for raising and lowering one end 80A of the forming section 80 in the direction of the arrows 86. The height of the end 80A of the forming section 80 is raised or lowered as desired in order to increase or decrease the rate of travel of the mass of candy material 90 along the conical rollers in the forming section 80. The speed of travel of the candy material is regulated and determined by the output of the lollipop forming machine and also can be influenced by a number of factors, such as the temperatures of the candy material and center-filled materials, and the formulation of the materials forming the three-phases.

A rope forming sizer mechanism 88 can be positioned on the end of the batch forming mechanism 24. The sizing mechanism 88 includes up to three pairs of roller members 92 which deliver a predetermined size of rope material for further processing. The pair of sizing wheels 92 are adjustable and can be rotated at various speeds depending on the rate of movement necessary for the production of the final lollipop products.

A heater member can be positioned beneath the rollers 92 in order to maintain appropriate heat transfer to the products being formed. Also, in the forming section of the batch forming mechanism 24, preferably two or more of the conical roller members are adjustable in order to facilitate candy masses 90 of different sizes and to help facilitate changes in the rate of travel of the material through the forming section 80. In this regard, roller members 40A and 40B are adjustable in the direction of the arrows 100 and 101 in FIG. 5.

The discharge end 110 of the tubular member 36 is preferably positioned approximately 50-75 percent of the distance along the length of the batch forming mechanism 24 (and thus along the length of the forming section or portion 80). The tubular member 36, which preferably is made of several articulated portions, is typically made from a metal material, such as stainless steel, and coated and lined with Teflon. The discharge end of the metal tube can be knurled or deformed to prevent the Teflon coating from sliding off of it.

Figures 7, 8:
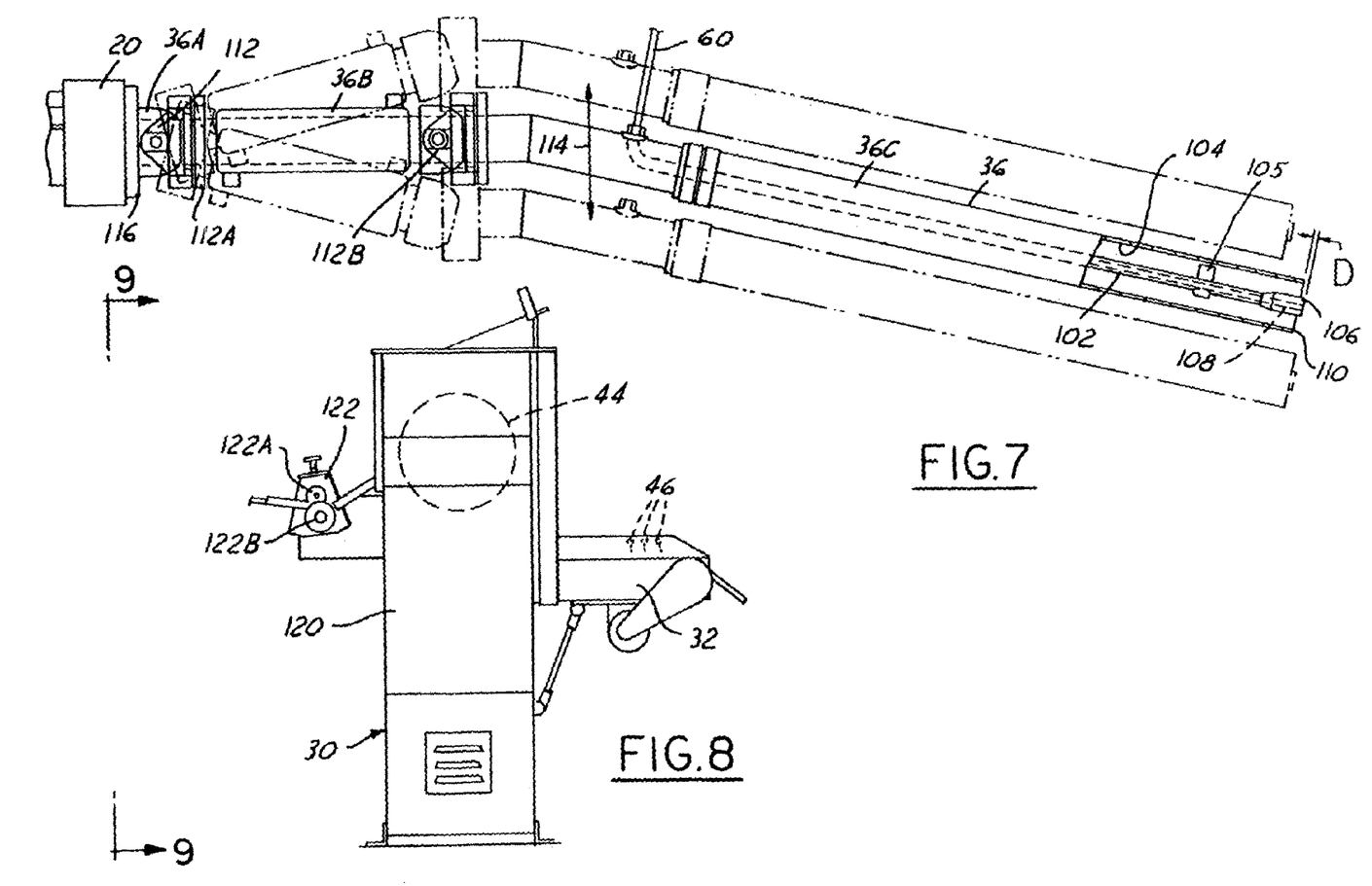
FIG. 7 is a schematic diagram illustrating an adjustable tubular member for extrusion of the center-filled gum material into the batch forming mechanism.
FIGS. 8, 9, and 10 are side, front and top views, respectively, of one preferred lollipop forming mechanism for use with the present invention.

As shown in FIGS. 4 and 7, an elongated pipe or conduit member 102 is positioned in the hollow center 104 of the tubular member 36. The conduit 102 can have a regular end or an enlarged head 106 at the discharge end and has a central passageway 108 throughout its length. Conduit 102 is positioned and supported in passageway 104 in any conventional manner, such as by fin supports 105.

The extruded gum or bubble gum material is extruded and passed through the passageway 104 in the tubular member 36 around the elongated conduit 102. The semi-liquid material used for the center-fill of the gum material is passed through passageway 60 into central passageway 108 in the conduit 102. The semi-liquid material is discharged from the end of tube 108 into the gum material as the gum material exits from the tubular member 36. The enlarged head member 106 at the end of the tubular member 102 creates a defined space or cavity of slightly increased size in the extruded gum material which allows the extruded semi-liquid-fill material to form a consistent and distinct phase layer in the gum material. Not only does this provide a defined area for the semi-liquid-fill material, but also creates a circular cavity for the semi-liquid material to fill. The discharge end of the tubular member 102 is preferably extended into the batch forming portion 80 a distance D on the order of one inch past the end 110 of the tubular member 36. This creates a smooth transition between the mass of candy material 90 in the batch former mechanism and the extruded gum or bubble gum material exiting from the tubular member 36.

The head member 106 is preferably made detachable from the tubular member (such as with a threaded connection) so head members of different sizes can be utilized to allow different amounts of center fill materials to be provided in different products.

Preferably, the tubular member 36 is positioned precisely in the center of the forming section 80 and equi-distance from the roller members 40A-40D. This provides a three-phase product 42 having a cross-section of uniformly sized layers. In this regard, if the tubular member 36 were to be positioned closer to one or two of the roller members than the others, then the resultant extruded rope product could have an outer candy layer with a non-uniform or inconsistent thickness around the gum or bubble gum material. This could result in unacceptable final products and possibly lead to the leakage of the liquid center-fill material from the rope of materials during further processing.

In order to maintain the discharge end 110 of the tubular member 36 in the center between the roller members 40A-40D in the batch forming mechanism and still allow the angle of the batch forming mechanism 80 to be changed as desired, as discussed above, a swivel and pivoting mechanism 112 is provided, as shown in FIG. 7. The mechanism 112 has two swivel/pilot linkages ("knuckles" or U-joints) 112A and 112B positioned between portions 36A, 36B, and 36C of the tubular member 36 in order to allow the portion 36C of the tubular member which is positioned inside the forming section 80 to be adjusted vertically in accordance with arrows 114 and maintain its position in the center of the batch forming rollers 40A-40D. The swivel/pivot linkages preferably allow for at least 15° of angular movement of the tubular member. As shown in FIG. 7, the initial tubular section 36A is attached directly to the extruder 20. The gum or bubble gum material is extruded through circular die member 116 positioned at the end of the extruder 20 such that a circular cross-section rope of gum or bubble gum material is extruded into the tubular member 36 and passed through it.

Figure 9:
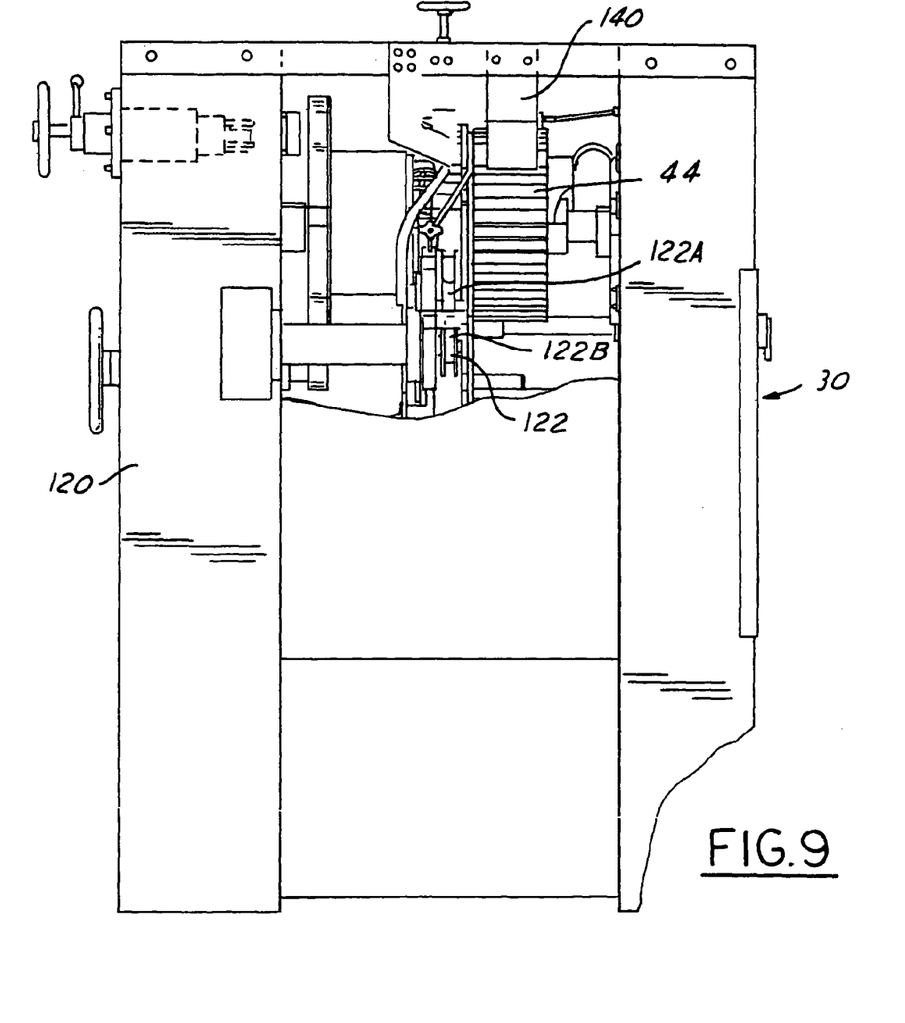
Figure 10:
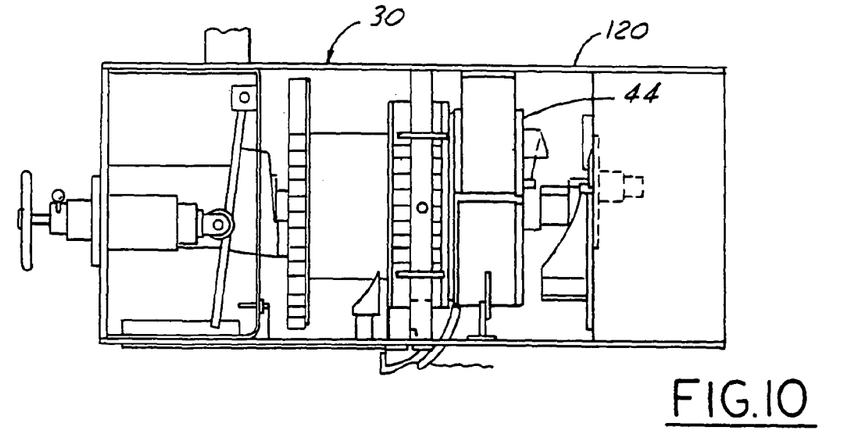
Figure 11:
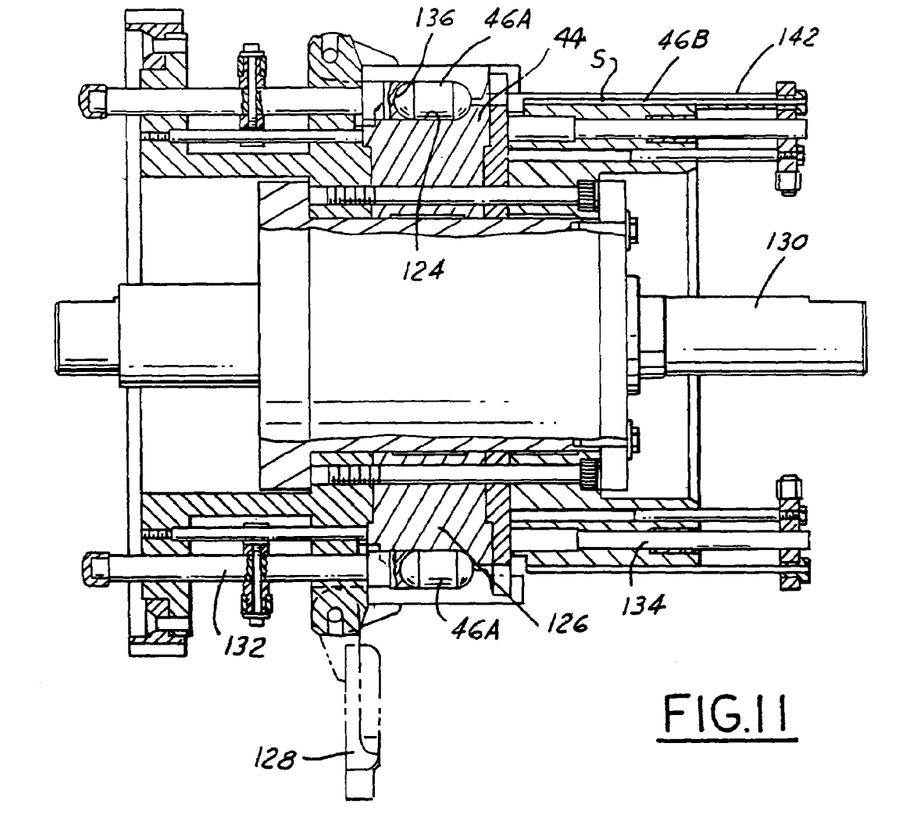
FIG. 11 is a partial cross-sectional view of a lollipop forming head mechanism in accordance with the present invention.

One preferred lollipop forming mechanism 30 is shown in FIGS. 8, 9 and 10. Details of the rotating drum mechanism are shown in FIG. 11. The lollipop forming machinery can be provided, for example, from Latini or another company which make similar products and are available in the marketplace. In this regard, Model BLP-4 ball lollipop forming machine from Latini Machine Company can be utilized for this purpose. In general, the lollipop forming machinery 30 includes a housing 120, a feeder/sizer mechanism 122, a rotating drum 44, and a conveyor mechanism 32.

In accordance with the lollipop-forming machine 30, a rope of material, such as solid candy material is passed through a feeder/sizer mechanism 122 and around a rotating drum 44 which includes a plurality of forming dies 124. The feeder/sizer mechanism 122 includes a pair of vertically positioned roller members 122A and 122B (see FIG. 9) which convey the rope of material in an appropriate thickness where it is positioned in the forming dies 124.

The forming dies 124 include a series of semi-circular grooves around the outer periphery of a rotating ring member 126 and a plurality of semicircular groove members 128 which are hinged to the drum member 44 in order to allow entry of the extruded material into the groove members 124 and allow ejection thereof after the final products are formed.

The drum member 44 rotates around a central spindle 130 and also includes a plurality of cam-operated plunger members 132 and 134 which are positioned on opposite sides of the semi-circular die grooves. When the hinged die groove member 128 is positioned adjacent the die groove members 124, an oval shaped cavity 136 is formed and in which the candy material is positioned to be formed in the same shape. The lollipop sticks S (46B) are positioned in a stick magazine or hopper 140 and automatically dispensed one by one into a stick inserting channel 142 adjacent the drum mechanism 44. A separate plunger member (not shown) pushes the lollipop stick S axially or longitudinally and inserts it into the semi-solid formed candy portion 46A of the lollipop. In this regard, as shown in FIG. 6, the stick member S is only inserted into the candy portion C and gum portion G of the lollipop 46. This maintains the integrity of the gum seal around the liquid center-filled portion L and prevents the liquid material from leaking from the candy portion 46A and/or creating an unacceptable commercial product.

Figure 12:
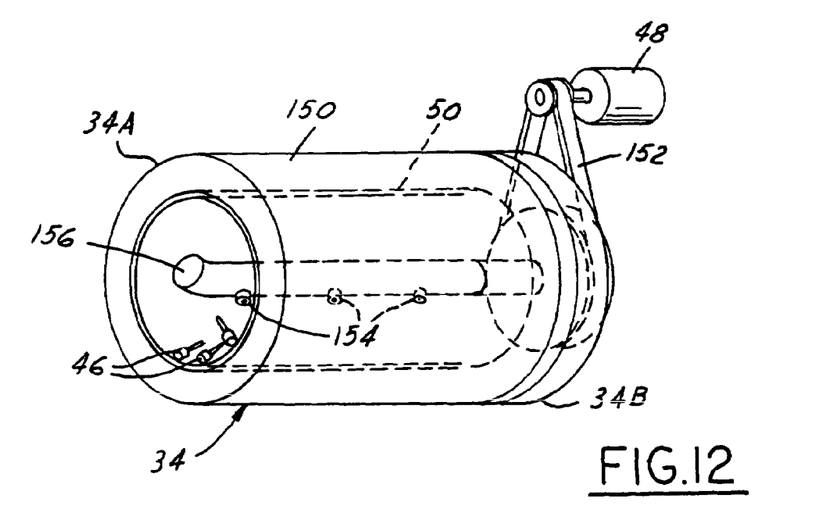
FIG. 12 is a schematic diagram of a rotating cooling tunnel for use with the present invention.

The lollipop products 46 are ejected from the lollipop forming machines 30 or 180 into the conveyor mechanism 32 where they are conveyed into the cooling mechanism 34. Preferably, the lollipops are formed with a small piece of candy material between them, holding them together in a continuous string of pops. The string of pops fall off as the die drum rotates, allowing the pops to fall onto the conveyer belt positioned below the forming dies. The cooling tunnel 34 includes an outer housing 150 and a central rotating cage member 50. The cage member 50 is rotated by motor 48 and belt drive 152.

Air is injected through openings or ports 154 in tube or passageway 156 which is positioned in the center of the rotating drum 50. The final lollipop products 46 are tumbled and cooled in the cooling tunnel 34 as they progress from the entrance end 34A to the exit end 34B. If the pops are not separated when they enter the cooling tunnel, the tumbling will separate them into individual lollipops. The tumbling also helps in maintaining a better and more uniform round shape for the final products. The continuous movement of the formed lollipop products in the cooling mechanism prevents deformation of their shape. The final lollipop products are either transported to storage for later processing, or sent directly for packaging and subsequent shipping to customers.

Figure 14:
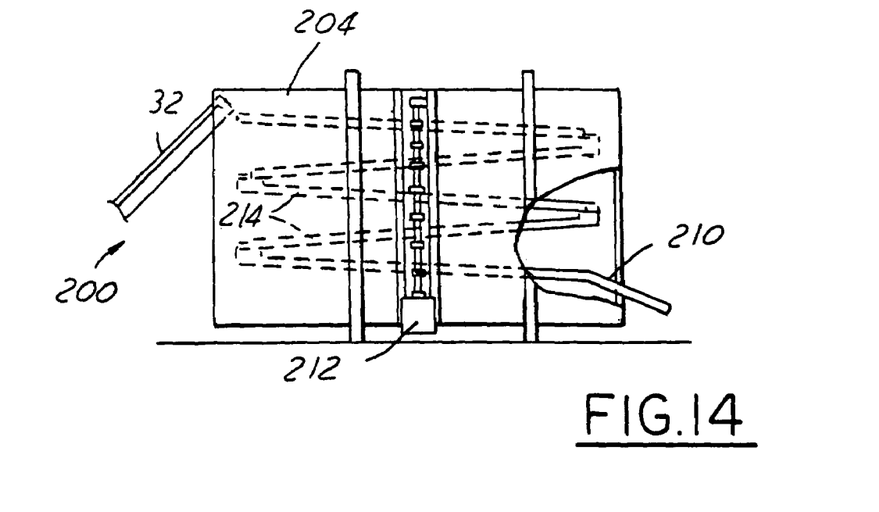
FIGS. 14 and 15 depict another preferred cooling mechanism for use with the present invention.
Figure 15:
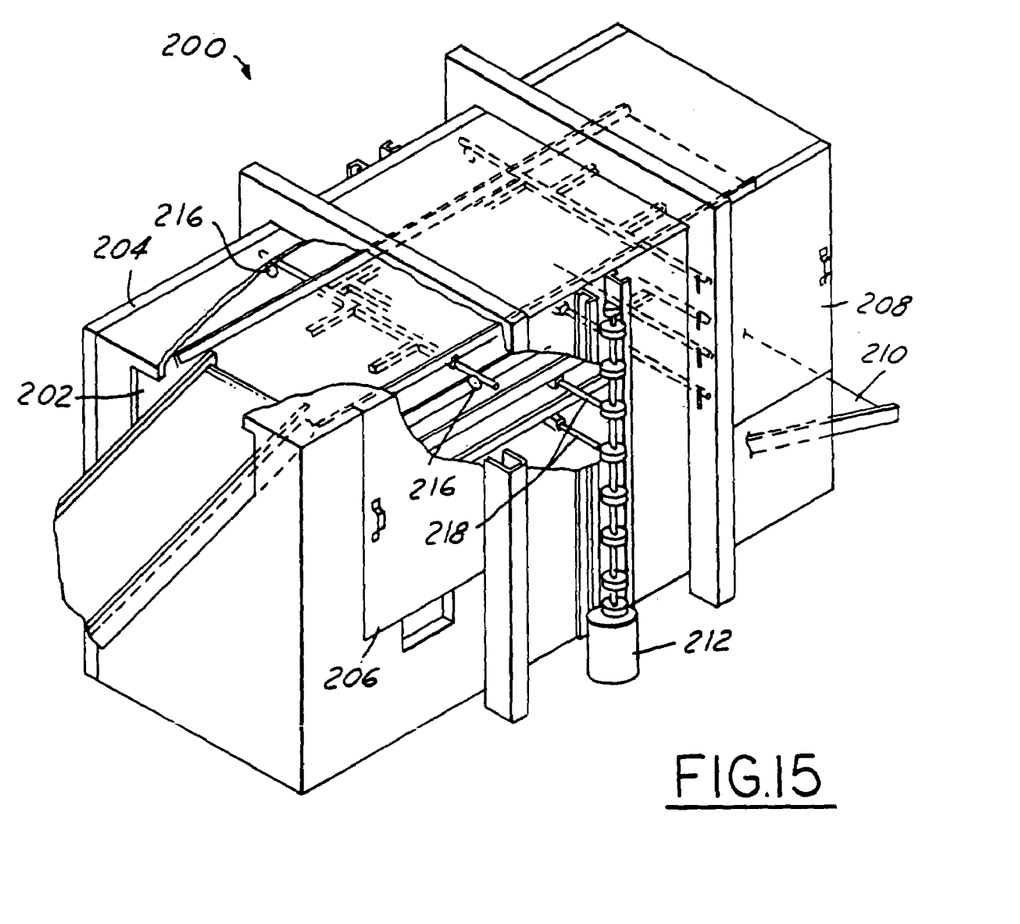

An alternate preferred cooling mechanism 200 is shown in FIGS. 14 and 15. The cooling mechanism 200 can be, for example, the type marketed by Aquarius Holland, such as Model No. BC1. The cooling mechanism 200 can be used in place of the cooling tunnel 34. It has the same purpose and is used in the same manner. The cooling mechanism 200 is positioned immediately following the forming machine 30. Conveyor mechanism 32 transports the lollipops into opening or entrance 202 in housing 204.

The housing 204 is made of, for example, sheet metal, in the size and shape generally shown in the drawings and has a pair of maintenance doors 206 and 208, an exit opening 210, and a motor controlled screw cam mechanism 212. Air is introduced into the housing and used to cool the lollipop products. A plurality of slanted tray members 214 are positioned inside the housing. The tray members are positioned on moveable wheel members 216 which allow the tray members to oscillate side to side in the housing. Post members 218 are connected to each of the tray members with outer ends operatively connected to the screw cam mechanism 212. Thus, as the screw cam rotates, the tray members oscillate quickly side to side. This in turn causes the lollipops on the trays to be shaken, tumbled and rolled on the tray members which allows them to cool uniformly and prevents deformation.

The plurality of tray members 214 in the housing are slanted alternately in opposite directions (as shown in FIG. 14) so that the lollipops can travel back and forth in the housing. The lollipops are shaken and travel along the length of the uppermost tray, drop onto the tray positioned immediately below, and move in that manner repeatedly to the bottom tray in the housing where they exit through opening 210. The lollipops exiting the cooling mechanism 200 are collected into boxes or containers (not shown) for transport to storage for later processing, or transported directly for packaging and subsequent shipment to customers.

The rope sizing mechanism 28 includes a flat surface on which a plurality of pairs of sizing rollers 74 and 76 are positioned. A roller cluster can be positioned at the entrance end of the sizing table, although it is also possible to have a pre-sizing mechanism attached to the end of the batch forming mechanism 24, as explained above. The rope sizing mechanism 28 includes a table member 29 having a plurality of roller members thereon which convey and accurately size the cross-sectional diameter of the three-phase extruded rope product for entry into the lollipop forming mechanism 30.

Preferably one set of cluster rollers and two pairs of flat rollers are used to properly size the rope of material. In this regard, the gum material can be reduced in size to 2.00 inches in diameter in the cluster rollers, to 1.50 inches in the first pair of flat rollers, and to 1.25 inches in the second pair of flat rollers. The infeed rollers on the forming machine can further slightly reduce the diameter to a final size of 1.20 inches.

Another lollipop forming mechanism which can be used with the present invention is a chain-forming mechanism from Euromec in Italy. This mechanism uses a pair of rotating chain members instead of a rotating die drum member as provided in the Latini mechanism. The chains each have sets of semi-circular die grooves on them which come together on the three-phase rope of material to cut and form it into separate balls or pieces of semi-molten candy material. Lollipop sticks are inserted into the balls of candy in the Euromec mechanism and the final lollipop products are ejected from it onto a conveyer mechanism. Another company with a lollipop forming mechanism or machine which can be utilized in the present invention is Robert Bosch GmbH in Germany.

Figure 16:
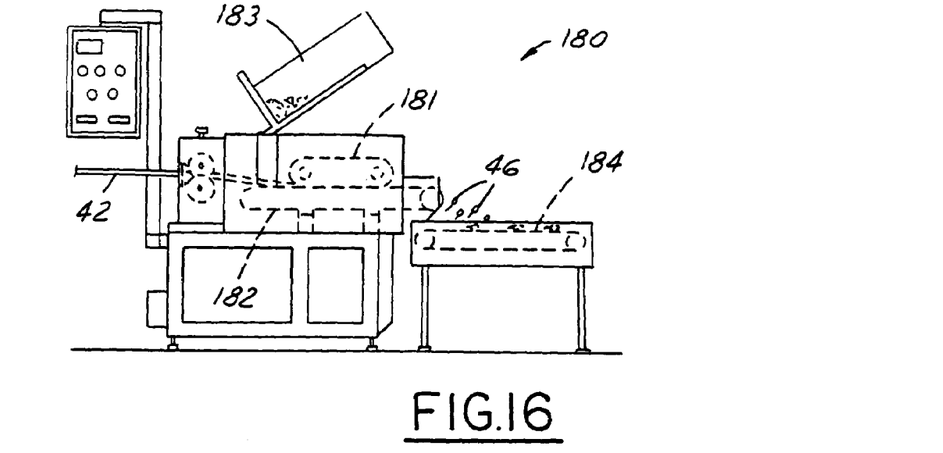
FIGS. 16 and 17 depict another preferred lollipop forming mechanism.

A representative chain-forming machine of this type is shown generally in FIG. 16 and designated generally by the reference numeral 180. The forming machine 180 incorporates two mating rotating chains 181 and 182—as better shown in FIG. 17—to form the lollipops (rather than a rotating drum member as discussed above). Each of the two rotating chains has one portion of the completed forming die which is used to form the final shape of the lollipop. The rope of gum 42 is fed into the intersection where the two chains come together as they rotate. The two portions of the individual forming dies mate together at that point severing the rope of material and forming the separate piece into an oval shape (or the shape of the forming die). The two die portions travel together in their mated closed position for a certain portion "D" of the length of the chains. This sets the final shape of the product and also the allows the lollipop sticks to be inserted from one side from a stick hopper 183.

Figure 17:
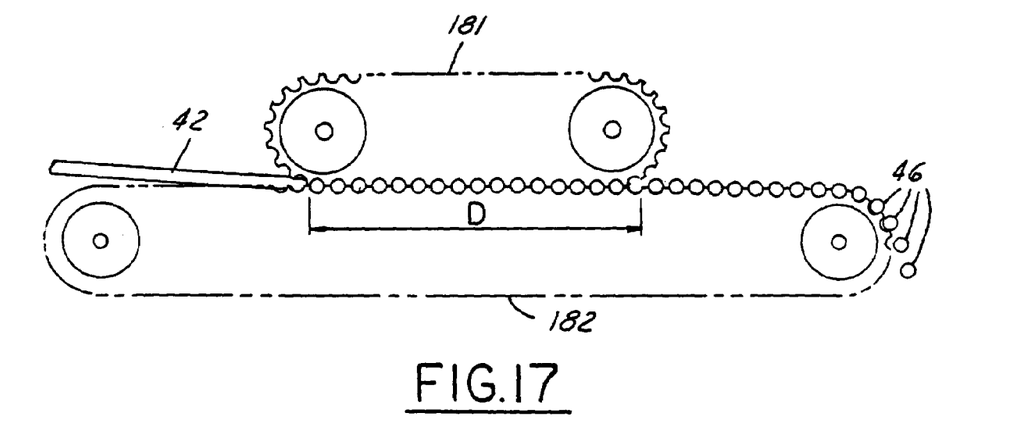

As the chains separate after the forming process, the formed lollipop products 46 with attached sticks drop from the forming machine onto a conveyor 184 where they are transported into a cooling and tumbling mechanism, such as cooling mechanisms 34 or 200.

With any of the various forms of the present invention, a stable center-filled product is provided. The semi-liquid center-fill is effectively housed in a gum or bubble gum core or shell which in turn is surrounded by a hard candy shell. The three layers of material form a stable lollipop that does not leak.

The formula for semi-liquid center-fill material used with the present invention has a high percentage of Pectin which helps prevent the center-fill from passing through the gum or bubble gum material and thus leaking from the lollipop product. The amount of Pectin is on the order of 1.0-1.3 percent by weight of the final product which helps prevent the semi-liquid fill from gelling. Also, the gum and center-fill material L are kept at a lower temperature, on the order of less than 50° C., which also prevents the semi-liquid material from gelling or decreasing in viscosity.

During the process in accordance with the present invention, it is important to maintain the temperatures of the materials L, G, and C within appropriate ranges. "Plastic" states of the candy, gum, and semi-liquid center-fill materials are necessary when the lollipop stick S is inserted in order to prevent puncture of the semi-liquid material and subsequent leaking. These temperatures are below the glass transition temperatures at which the materials will turn into solids and above the flow temperature at which the temperatures will turn the materials into flammable liquids. An example of a formula of material for a blueberry flavored center-fill layer L is as follows:

| Materials | % By Weight |
|---|---|
| Sugar | 8-9 |
| Water | 9-10 |
| Glucose Syrup 42DE | 60-62 |
| Glycerin | 17-19 |
| Citris Pectin USPL-200 | 0.3-0.5 |
| Citric Acid Anhydrous | 6-8 |
| RED No. 40 | .002-.003 |
| Blue No. 2 | .0002-.0004 |
| Blueberry Flavor | 0.40-0.60 |

The Pectin is mixed in gently with the Glycerin. The mixture of corn syrup, sugar, water and Glycerin (containing Pectin) is then cooked to 110° C. The mixture is then cooled to 90° C. and the acid, color and flavor are added. The material has a jelly-like consistency. The amount of Pectin thickens the semi-liquid center-fill material sufficiently to prevent it from passing through any cracks or voids in the center of the gum product where it can migrate and pass to the outside creating difficulties in the lollipop forming process and creating unacceptable final products.

Figure 13:
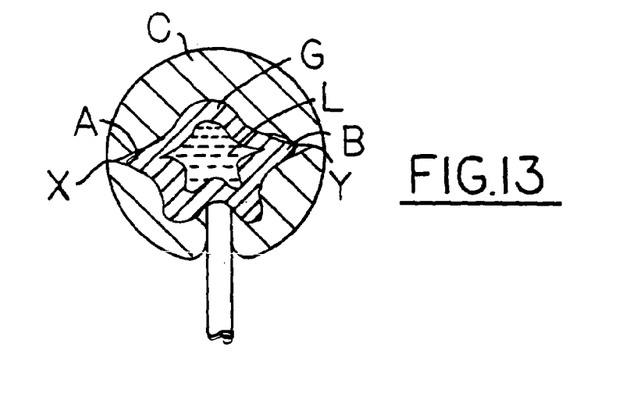
FIG. 13 is a cross-section of a lollipop product made in accordance with the present invention.

One of the issues in producing acceptable final lollipop products in the lollipop forming mechanism 30 is the prevention of leaking of the liquid material L from the center of the extruded rope when the semi-circular dies come together forming the candy portions 46A of the lollipop products 46. The edges of the circular dies come together compressing the extruded rope at portions X and Y as shown in FIG. 13. The center gum or bubble gum material G is also squeezed at both ends forming flattened portions A and B. The maintenance of the liquid portion L at a thicker composition, such as with increased amount of Pectin in the formulation, assists in preventing the semi-liquid center-fill material L from being squeezed out the joint or seam along portions A and B at points X and Y of the candy shell C.

Representative examples of formulas and mixing processes for a bubble-gum material for use in the gum G portion of a three-phase blueberry flavored lollipop product and a candy material for use in the candy C portion, are as follows:

| Gum | % By Weight |
|---|---|
| Corn Syrup | 13-17 |
| Gum base blend | 18-22 |
| Sugar (pulverized-2/3) | 38-43 |
| Citric Acid USP Andhyrous Powder | 0.70-1.1 |
| D & C Blue #2 A2.Lake | 0.02-0.04 |
| Glycerin USP Special | 0.45-0.65 |
| Sugar (pulverized-1/3) | 18-22 |
| Corn Oil (Mazola) | 0.15-0.35 |
| Blueberry Flavor | 0.8-1.2 |

The corn syrup and gum base blend are inserted into a batch-type kettle mixer and mixed for a minimum of one minute with the mixing blades rotated in one direction and mixed for a minimum of three minutes with the blades rotated in the opposite direction. The kettle temperature is kept at approximately 120° C. with the jacket at a temperature of 120° C. The final gum base temperature is 77-85° C. and the gum drop temperature is 45-51° C. Two-thirds or the sugar, the citric acid and blue coloring are then added to the kettle and the mass is further mixed for at least three minutes. The glycerin is then added during the mixing process and the mass is continued to be mixed with the blades rotating for at least one-half a minute in each direction. The remaining one-third of the sugar is then added and the mixing is continued for at least another two minutes. The corn oil and blueberry flavor are added at the end and the mixing is continued for several more minutes.

The candy material is primarily granulated sugar (about 55.0% dry) and glucose syrup (about 45.00% dry). Water is added as the ingredients are inserted into a cooking pot. The color solution is added after the candy is cooked and is about 1.33% FD&C Blue #2, 0.33% FD&C Red #40, and 98-33% spring water. The candy is cooled 15 minutes and at a vacuum pressure of 30" Hg. The candy base is then cooled to about 120° C. The temperatures of the candy cooling table and kneading table at 105° C. The candy temperature after kneading is 81° C. The flavor portion is premixed and comprises blueberry flavor, malic acid and citric acid in ratio amounts of 0.20, 0.30, and 2.00, respectively. The cooked candy is poured onto a cooling table and the flavor premix is placed on top of the candy mass and then kneaded into it.

A representative final lollipop product can have a final total weight of about 20 grams. The weight comprises 4.3 grams of gum G, 0.7 grams of semi-liquid-fill L, and 15.0 grams of hard candy C. Another preferred ratio of the ingredients is 60% by weight of the hard candy shell, 30% by weight of the gum material, and 10% by weight of the filling.

The processing parameters and procedures for a representative process and system in accordance with the present invention can be set forth in the following description. The gum material has a temperature of 51° C. when it enters the extruder—and an exit temperature of 46° C. The head temperature is at 63° C. and the barrel temperature is at 120° C. The extruder speed is 14 rpm. The liquid-center fill temperature is 43° C. and it is injected into the gum material at 140 psi. The candy temperature inside the batch former is controlled to about 81° C. and the direction of rotation of the rollers in the roller cluster is reversed every 60 seconds. The rope sizer has a speed of 50 rpm and the sizes of the spaces between the flat rollers in the two sizing roller sections is 1.50 inches and 1.25 inches. The extra heaters in the batch former and sizing roller sections are turned off. The rollers on the forming machine provided a final size of the rope entering the forming dies of 1.20 inches in diameter. The speed of the cooling arm is 80 rpm and the angle of the drum is 3° from horizontal.

While the invention has been described in connection with -one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method of making a three-material lollipop product, said steps comprising:

extruding a rope of gum material from an extruder into a tubular member;

transporting said extruded rope of gum material through said tubular member into a batch forming mechanism;

injecting a center-fill semi-liquid material into said rope of gum material;

continuously molding molten candy material around said tubular member and said gum material in said batch forming mechanism thereby forming a rope of candy coated center-filled gum material;

transporting said rope of candy coated center-filled gum material to a lollipop forming mechanism; and forming individual lollipop balls from said candy coated center-filled gum material in the lollipop forming mechanism.

2. The method as set forth in claim 1 further comprising the step of sizing said candy coated gum material in a sizing mechanism prior to forming individual lollipop balls in said lollipop forming mechanism.

3. The method as set forth in claim 1 further comprising the step of inserting sticks into said lollipop balls to form lollipop products.

4. The method as set forth in claim 3 further comprising the step of cooling said formed lollipop products.

* * * * *

UNITED STATES PATENT AND TRADEMARK OFFICE
CERTIFICATE OF CORRECTION

| | | |
|---|---|---|
| PATENT NO. | : 7,332,186 B2 | Page 1 of 1 |
| APPLICATION NO. | : 10/664427 | |
| DATED | : November 22, 2005 | |
| INVENTOR(S) | : Jani et al. | |

It is certified that error appears in the above-identified patent and that said Letters Patent is hereby corrected as shown below:

At column 10, line 32-33, "...and 98-33% spring water". Should read as follows:

--...and 98.33% spring water.--

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,332,186 B2 | Page 1 of 1 |
| APPLICATION NO. | : 10/664427 | |
| DATED | : February 19, 2008 | |
| INVENTOR(S) | : Jani et al. | |

It is certified that error appears in the above-identified patent and that said Letters Patent is hereby corrected as shown below:

At column 10, line 32-33, "...and 98-33% spring water". Should read as follows:

--...and 98.33% spring water.--

This certificate supersedes the Certificate of Correction issued July 15, 2008.

Signed and Sealed this

Fifth Day of August, 2008

JON W. DUDAS
*Director of the United States Patent and Trademark Office*